Dec. 26, 1939.  E. J. LOCKWOOD  2,185,030
TANK VEHICLE CONSTRUCTION
Filed Feb. 4, 1938  5 Sheets-Sheet 1
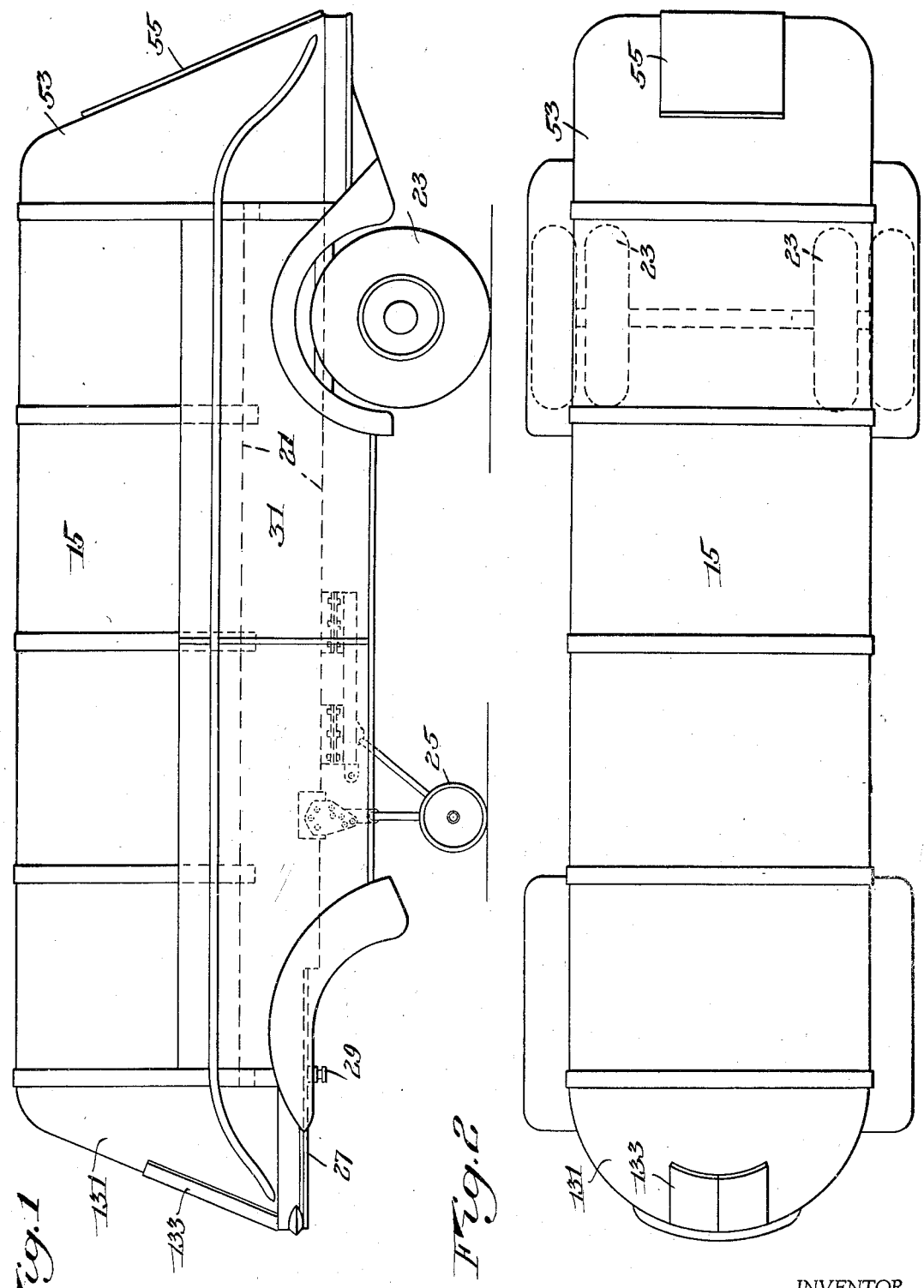
INVENTOR.
Edwin J. Lockwood
BY Cumpston & Shepard
his ATTORNEYS

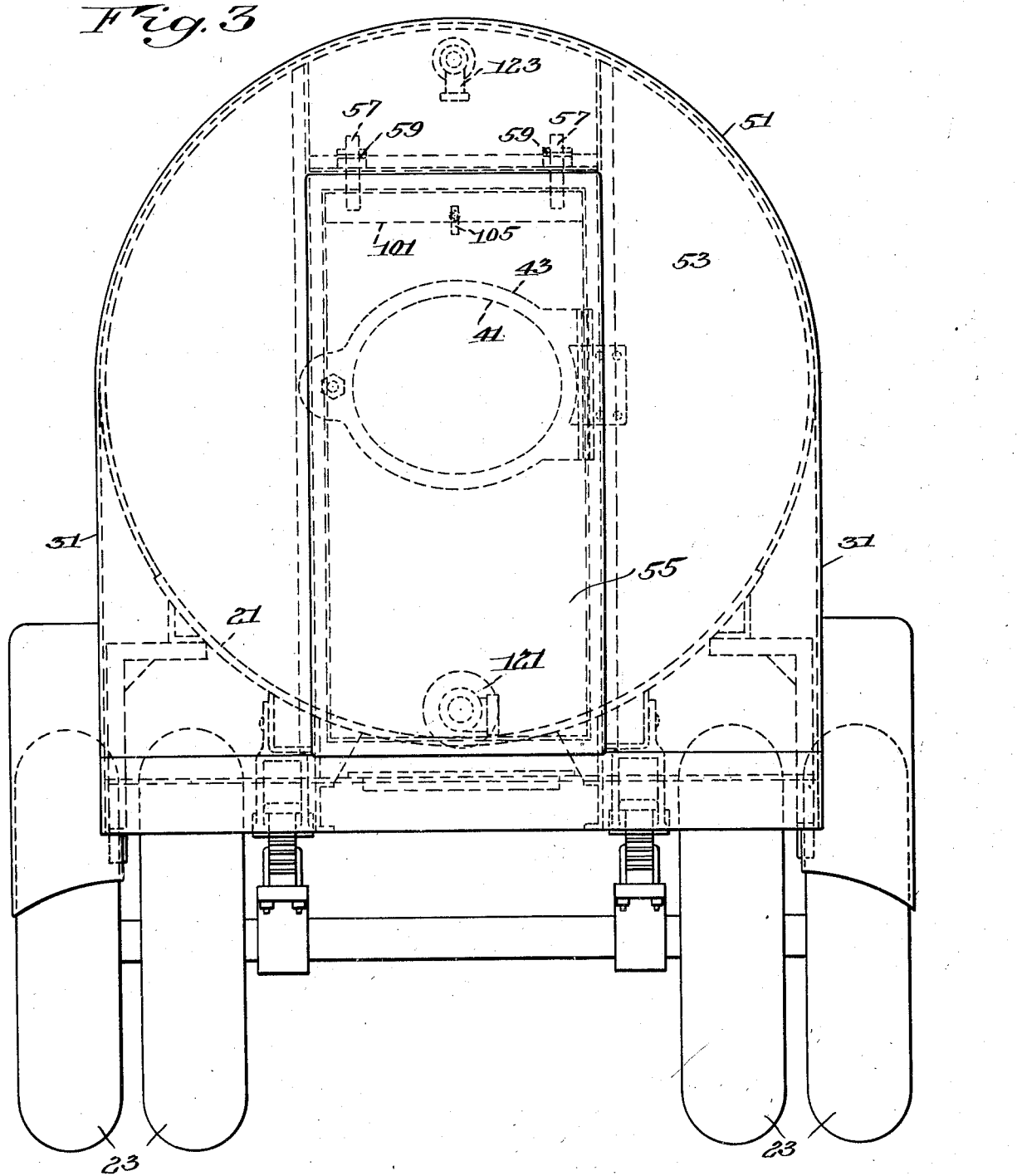

Dec. 26, 1939.   E. J. LOCKWOOD   2,185,030
TANK VEHICLE CONSTRUCTION
Filed Feb. 4, 1938   5 Sheets-Sheet 3
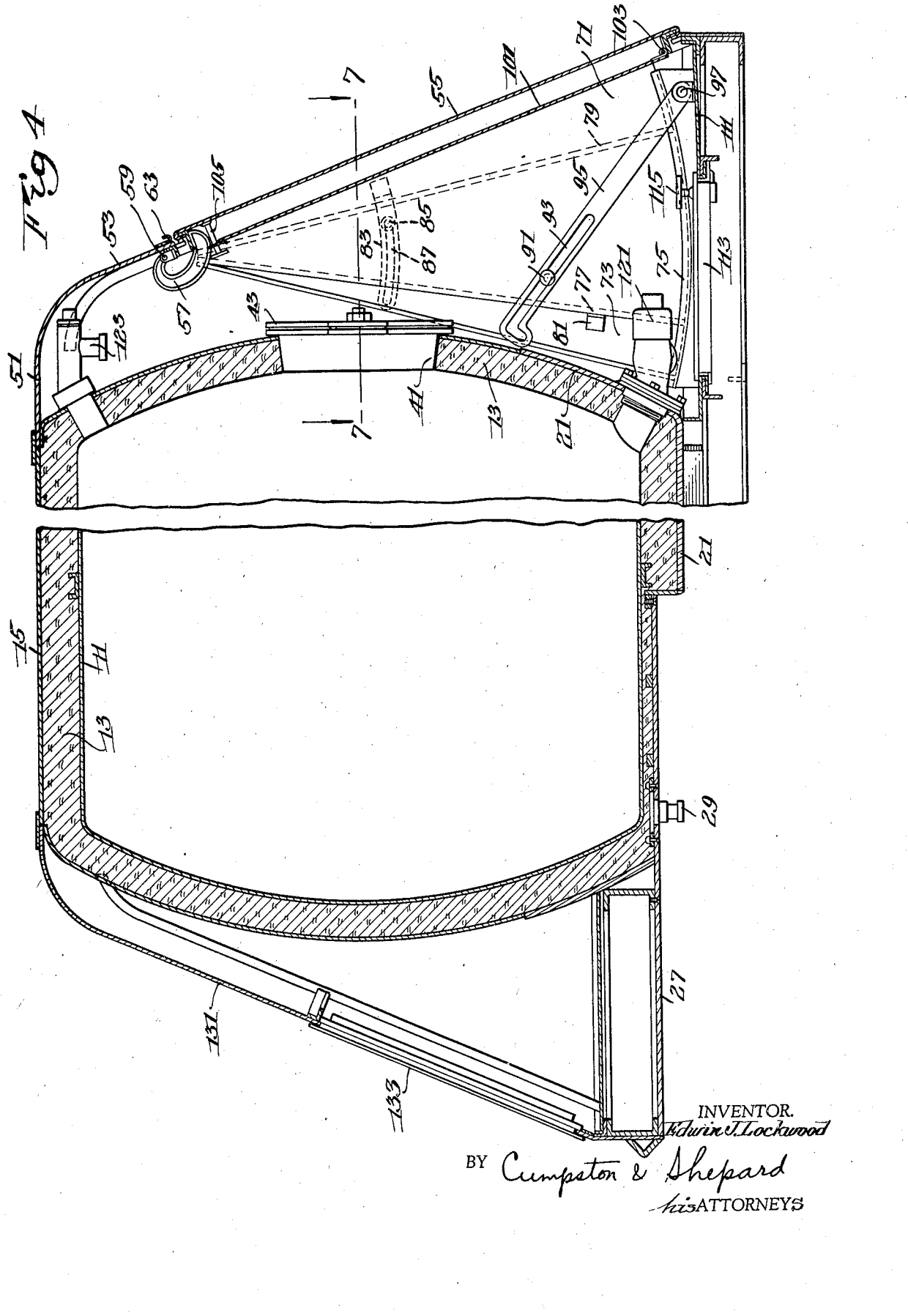
INVENTOR.
Edwin J. Lockwood
BY Cumpston & Shepard
his ATTORNEYS

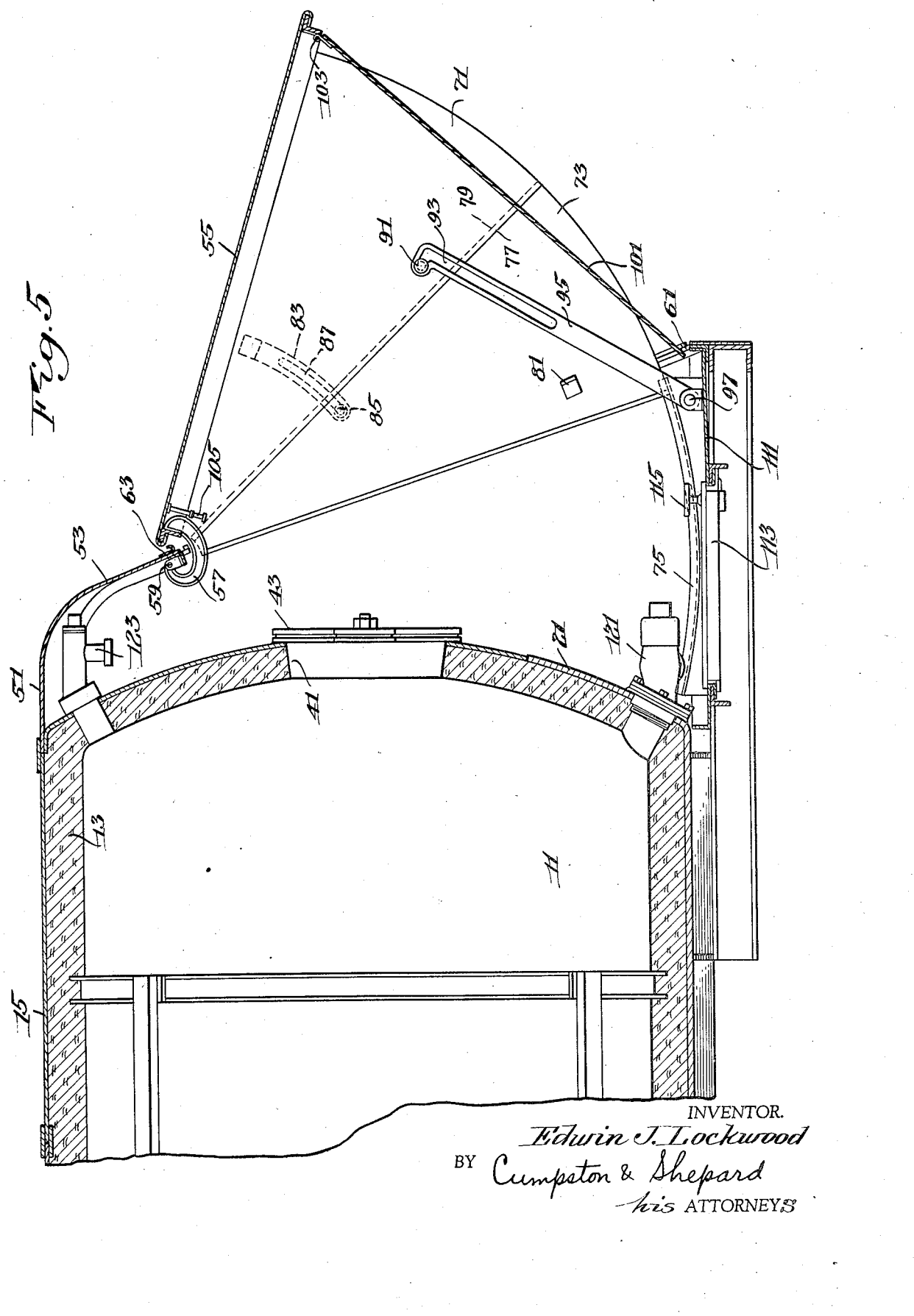

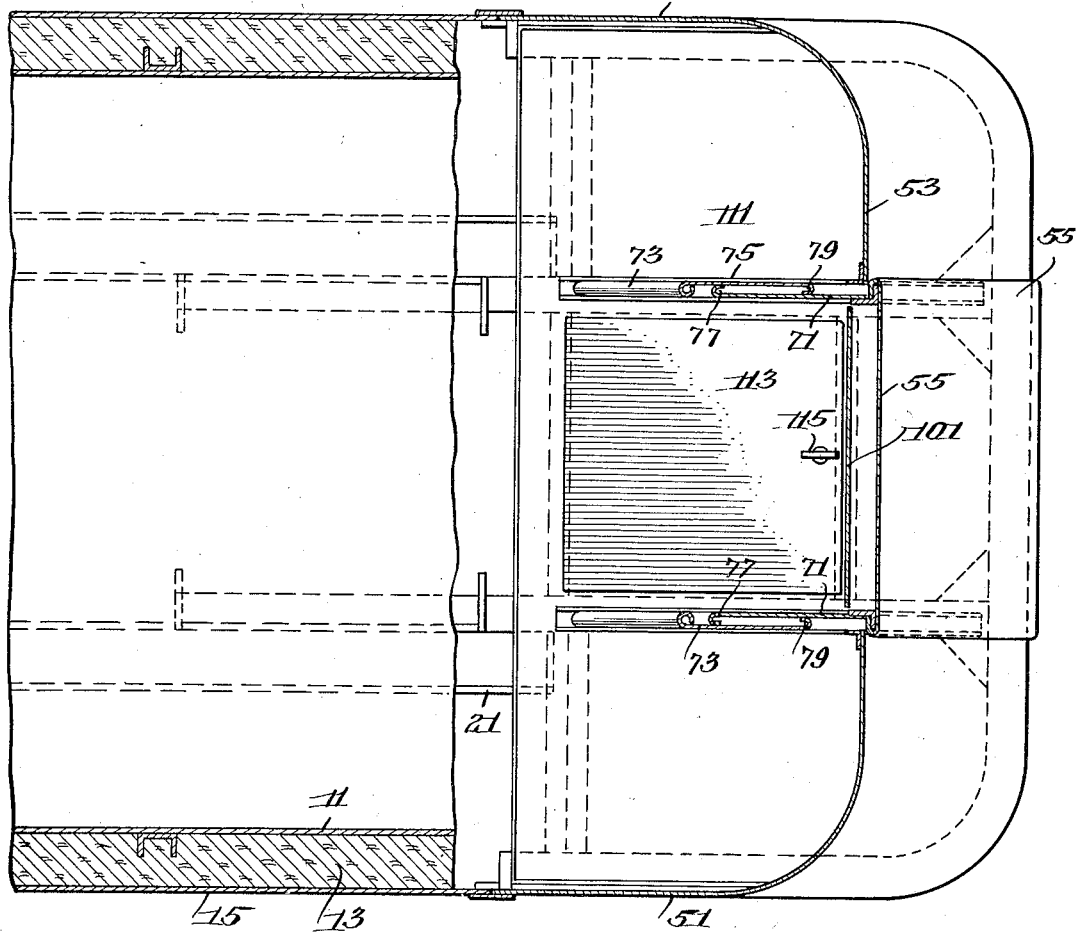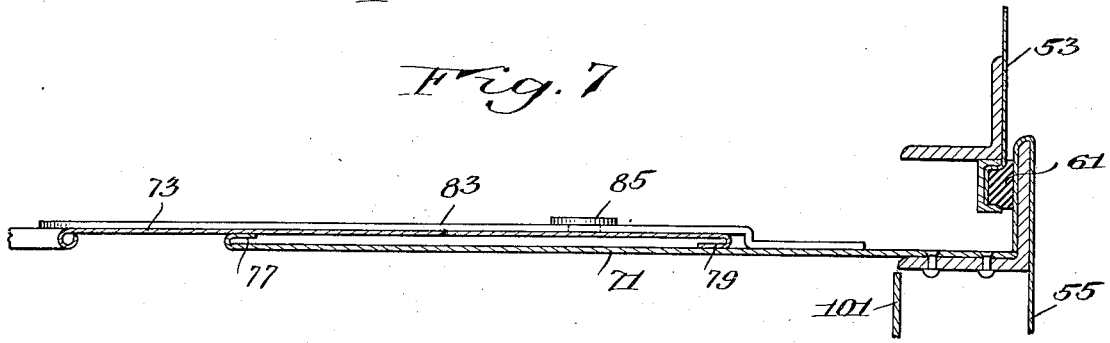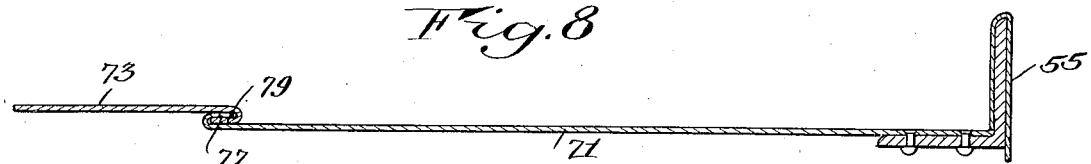

Patented Dec. 26, 1939

2,185,030

UNITED STATES PATENT OFFICE 2,185,030

TANK VEHICLE CONSTRUCTION

Edwin J. Lockwood, Peekskill, N. Y.

Application February 4, 1938, Serial No. 188,740

3 Claims. (Cl. 220—30)

This invention relates to tank vehicles for transporting fluids, and especially to vehicles of the type known as automotive trailers or semi-trailers, although the invention is not limited to such trailers and may be used also on powered automotive vehicles, on vehicles drawn by horses, and for vehicles operating over snow or ice on sled runners.

An object of the invention is the provision of a generally improved and more satisfactory tank vehicle or fluid transporting vehicle, especially adapted for transporting fluids of the class known as liquids, though applicable also to fluids of the gaseous class.

Another object of the invention is the provision of a tank vehicle having improved means for access to the interior of the tank for cleaning and servicing the same, and improved means for protecting the cleaning opening against entrance of dirt or other foreign matter.

To these and other ends the invention resides in certain improvements and combinations of parts, all as will be hereinafter more fully described, the novel features being pointed out in the claims at the end of the specification.

In the drawings:

Fig. 1 is a side elevation of a tank vehicle constructed in accordance with a preferred illustrative embodiment of the present invention;

Fig. 2 is a plan thereof;

Fig. 3 is a rear end view thereof;

Fig. 4 is a longitudinal vertical section taken centrally through part of the vehicle, with the rear canopy door in closed position;

Fig. 5 is a view similar to a fragment of Fig. 4 showing the door in open position and the bottom dust guard in closed position;

Fig. 6 is a horizontal section through the rear part of the tank;

Fig. 7 is a fragmentary horizontal section taken substantially on the line 7—7 of Fig. 4, illustrating the side dust guards in closed position, and Fig. 8 is a somewhat similar diagrammatic view showing the side dust guards in open position.

The same reference numerals throughout the several views indicate the same parts.

The present patent application is a continuation in part of my prior application for patent on Vehicle construction, Serial No. 145,659, filed June 1, 1937, and the present application is filed as a result of a requirement for division made by the Patent Office in said prior application.

The present invention will now be described in connection with a concrete illustrative embodiment in the form of an automotive semi-trailer designed for the transportation of milk, cream, fruit juices, or other liquid products intended for human consumption, which must be handled in a healthful and sanitary manner. It is to be understood, however, that many features of the present invention may be applied also to tank vehicles of other kinds and forms, and that the following specific disclosure in connection with the transportation of liquids having food value is not intended in a limiting sense, but only as a convenient example.

In the present illustrative example, the vehicle comprises a tank 11 of any suitable material such as thin metal, covered by a layer of insulation 13 of any suitable material such as cork composition, the insulation in turn being covered by an outer jacket 15 of thin metal or the like. The tank may be supported in any suitable manner, such as resting in a thick and strong cradle plate 21 (Fig. 3) which forms the main longitudinal frame or "backbone" of the vehicle. The cradle plate 21 may be supported in any suitable manner, such as by sled runners for travel on snow. In the form here shown, the rear end of the cradle is supported by pneumatic tired wheels 23 secured to the cradle in any suitable way, and by retractable standing wheels 25 for supporting the front end of the vehicle while it is not being transported. A flat plate 27 at the front end of the vehicle has a king pin 29 for engagement with the fifth wheel of a truck tractor unit, in known manner, when the vehicle here illustrated is to be used as a semi-trailer. The tank may be of circular, elliptical or any other desired cross sectional shape, a circular tank being here shown as a convenient example. Skirting 31 may extend downwardly at the sides of the tank from approximately the level of maximum diameter to a convenient point below the bottom of the tank.

When tank vehicles are used for transporting milk, fruit juices, and other liquids intended for human consumption, it is usually necessary to provide the tank with a manhole through which the tank may be entered in order to inspect and thoroughly clean the interior surface thereof from time to time. Great care must be taken to keep the tank sanitary at all times. It has heretofore been customary to place the manhole in the top of the tank, but such location is unsatisfactory, for two principal reasons. First, ladders are required, either built into or separate from the vehicle structure, for getting up to the manhole in order to enter the tank. Second, when the manhole is open during a cleaning operation, dust and dirt in the air settling approximately vertically downwardly can easily enter the manhole, with the result that boards of health in some large cities require that such tanks must be cleaned while indoors, rather than outdoors.

According to the present invention, these disadvantages of a manhole in the top of the tank are overcome, and a more sightly and pleasing construction is provided, by placing the manhole in one end of the tank. As an additional protection, the present invention provides also a canopy which encloses and protects the manhole so that dirt cannot enter the tank through the open manhole, thus permitting the tank to be entered and cleaned outdoors rather than indoors, even under the most stringent health regulations.

Referring now to Figs. 3 and 4, the tank of the present invention is provided with a manhole 41 at its rear end, closed by a manhole cover or door 43 mounted in any suitable known manner. Whatever the cross sectional shape of the tank may be, the manhole is preferably placed substantially at the center of the end of the tank; that is, in line with the longitudinal central axis of the tank. This provides a stronger construction of the end of the tank having the manhole, than if the manhole is placed in an eccentric position, so that the tank is better able to withstand pressure or vacuum. It also results in having the manhole at a convenient elevation above the bottom of the tank, so that a person within the tank may step out through the manhole fairly easily, instead of having to make his exit in an awkward manner such as by lying on the bottom of the tank and wiggling out through the manhole, as would be the case when the manhole is placed in an eccentric position near the bottom of the tank.

Around and covering the end of the tank in which the manhole is placed, is a canopy formed by side walls 51, the lower parts of which form rearward extensions of the side skirting 31 and the upper parts of which are rearward extensions of the upper curved part of the tank jacket 15, and by a rear wall 53 placed at a suitable inclination, as shown in Figs. 1 and 4, the walls 51 and 53 merging gradually with each other in a smooth curve as illustrated. In the rear wall 53 is a door 55 secured at its upper edge to bracket arms 57 hinged at 59 to the stationary wall part 53. This door 55 is adapted to swing upwardly and rearwardly to open the door to the position shown in Fig. 5. When the door is closed, in the position shown in Figs. 1 to 4, it rests on all peripheral edges against a soft rubber gasket 61 (Fig. 7) mounted in a channel on the fixed wall 53, thus forming a tight seal to prevent entrance of dust and dirt into the space within the canopy during travel. Any suitable latch or lock mechanism (not shown) may be used to keep the door 55 shut.

When the door is opened, it extends rearwardly from the pivot 59 with a slight downward inclination, as shown in Fig. 5, and serves in effect as a rearward continuation of the canopy, preventing entrance of dust and dirt settling downwardly through the atmosphere. A drip molding 63 extending across the top of the door opening on the exterior of the wall 53, serves to prevent water from dripping down through the small crack at the upper edge of the door when it is open, and also helps to reduce the size of the opening at this point, so that there is a negligible chance of undesirable foreign matter entering through the hinge crack.

Side dust guard plates are secured to the side edges of the door to extend from the door to the wall 53, when the door is open, in order to prevent lateral entrance of foreign matter into the space within the canopy. These side dust guards include a plate 71 (Figs. 4, 5, 7, and 8) fixed to and extending forwardly from the door 55 near each side edge thereof, and a second side guard member 73 floatingly mounted in sliding relation to the plate 71, the bottom edge of the plate 73 being arcuate and mounted for longitudinal movement in a curved track 75. The front or inner edge of the plate 71 is bent forwardly as at 77 and the rear or outer edge of the plate 73 is bent rearwardly as at 79, so that as the door is opened, the hook-like edge 77 of the plate 71 will engage with the hook-like edge 79 of the plate 73, as shown in Fig. 8, and pull the plate 73 rearwardly and upwardly along its track 75 to the fully open position shown in Fig. 5. The two plates 71 and 73, at each side edge of the door, thus fully protect the door opening against lateral entrance of foreign matter.

When the door is swung downwardly to its closed position, the inner or forward edge of the plate 71 will hit against an inwardly projecting lug 81 on the plate 73 and shove this plate forwardly or inwardly along its track 75, in telescoped relation to the plate 73, until the parts are brought to the closed position illustrated in Fig. 4.

An arcuate forwardly extending arm 83, welded or otherwise suitably fixed to the outer lateral surface of each plate 71, as shown in Figs. 5 and 7, extends forwardly just outside of the plate 73 and serves as a side guide for the upper part of the plate 73, holding it against lateral displacement from the plate 71 and preventing rattling of one plate on the other during movement of the vehicle. A headed stud 85 on the plate 73 extends laterally through an arcuate slot 87 in the arm 83.

When the door is opened, it may be held in open position by suitable retaining means such as a headed stud 91 on the plate 71, cooperating with an L-shaped slot 93 in a retaining link 95 pivoted at 97 to some suitably fixed point of the vehicle, such as the floor within the canopy. When the stud 91 is at the outer end of the slot 93, as shown in Fig. 5, the link 95 retains the door 55 in open position. If the link 95 be swung upwardly and forwardly so that the stud 91 is in line with the long arm of the slot 93, then the door may be closed to the position shown in Fig. 4, the link 95 meanwhile swinging about its pivot 97 to the closed position illustrated.

As still additional protection against entrance of foreign matter into the tank through the open manhole, a supplementary dust guard plate 101 is provided, pivoted at 103 to the door 55 near the bottom edge thereof. When the door 55 is closed, the guard 101 is placed substantially parallel to the door, inside the door, as shown in Fig. 4, and is held in this position by a releasable latch 105. After the door 55 has been swung open to the position shown in Fig. 5, the latch 105 may be turned to release the upper edge of the dust guard 101 and the dust guard may then be lowered down to the position shown in Fig. 5, in which one end of the dust guard is supported by its hinge 103 and the other end rests upon the rear edge of the door opening. With this dust guard in place, it is seen that it is perfectly safe to have the manhole open for cleaning purposes under any normal or usual conditions, for even a sudden gust of wind which would otherwise lift dust from the street and send it upwardly into the canopy space, cannot blow dust into this space with the dust guard parts substantially completely closing the canopy, as illustrated in Fig. 5.

Within the canopy space is a floor 111 the main portion of which is fixed, and which has an opening closed by a removable trap door 113 held in place by a latch 115 operable only from within the canopy. Thus, if the trap door be properly latched in place, and if a suitable lock be provided on the main door 55, no one can obtain unauthorized access to the space within the canopy.

For filling and emptying the tank, there may be provided an inlet and outlet connection fixture 121 at the bottom of the tank, within the canopy, and a pressure and vacuum fixture 123 at the top of the tank within the canopy. To fill the tank, a vacuum conduit may be connected to the fixture 123 and vacuum may be applied to the tank while a supply hose is brought up through the opened trap door 113 and connected to the filling fixture 121. For emptying, a discharge hose is connected to the fixture 121 through the opened trap door, and the valve in the fixture 123 is opened to allow air to enter the tank as the liquid leaves, or if still faster emptying is desired, the fixture 123 is connected to a compressed air hose to apply pressure to the interior of the tank.

In operation, when the tank is to be cleaned the trap door 113 remains shut, but the door 55 is opened to the position shown in Fig. 5, which automatically positions the side dust guards 71 and 73. The operator who is to clean the tank then steps into the space within the canopy and stands on the floor 111 and trap door 113. He then releases the latch 105 and lets the dust guard 101 down into its effective position shown in Fig. 5. The canopy is now substantially completely sealed against access of foreign matter in any ordinary or normal weather, even on a dusty street on a windy day. The operator now opens the manhole door 43, enters the tank through the manhole, and performs whatever inspection and cleaning are necessary, without danger of entrance of foreign matter into the tank while the manhole is open. The open door with its dust guards in effective position forms an extension of the canopy, greatly enlarging the working space therein so that the operator has ample room to open and close the manhole and perform any other necessary operations.

When the inspection and cleaning have been finished, the manhole is first closed tightly, after which the operator lifts up the inner end of the dust guard 101 and latches it on the latch 105, then steps out and down through the open doorway, and closes and locks the door 55.

A somewhat similar inclined canopy 131 is preferably placed at the front end of the tank, to give the tank a better and more symmetrical appearance and to decrease wind resistance when the tank is traveling at a high speed. This front canopy 131 preferably has a door 133 of any suitable form so that access may be obtained to the space within the canopy in which space tools, extra supplies, or any other desired equipment may be carried.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A tank vehicle including a tank having an approximately vertical end, a manhole in said end, walls forming a canopy enclosing at least a portion of said end around said manhole, said walls having a door opening therein, a hinged door cooperating with said opening and mounted to swing about a hinge axis approximately along the top of said opening, from a closed position outwardly and upwardly to an open position, and a dust guard plate hinged to said door adjacent the bottom edge thereof and so mounted that when said door is closed, said plate may extend upwardly along the inner side of the door, and when said door is open, said plate may be swung downwardly to extend approximately from the bottom edge of said door approximately to the bottom edge of said door opening.

2. A tank vehicle comprising a tank having an approximately vertical end wall, a manhole in said end wall, walls forming a canopy enclosing at least a portion of said end wall around said manhole, said walls having a door opening therein, a door having hinge means along one edge and cooperating with said opening, members secured to two opposite side edges of the door and extending inward toward the tank end wall and movable with the door to maintain the spaces between two sides of the door and two corresponding sides of the door opening closed when the door is open, and a dust guard plate adjacent the remaining edge of the door and so mounted that when the door is closed said plate may extend along the inside of the door and when said door is opened, said plate may be swung so as to extend approximately from said remaining edge of said door to the corresponding edge of the door opening.

3. A tank vehicle including a tank having an approximately vertical end wall, a manhole in said end wall, walls forming a canopy enclosing at least a portion of said end wall around said manhole, said walls having a door opening therein, a hinged door cooperating with said opening and mounted to swing about a hinge along the top of said opening from a closed position outwardly and upwardly to an open position, a dust guard plate hinged to said door adjacent one edge thereof, said dust guard plate being so mounted that when the door is closed said plate may extend along the interior side of the door, and when said door is opened said plate may be swung to extend from said edge of the door approximately to the corresponding edge of the door opening.

EDWIN J. LOCKWOOD.